(12) United States Patent
Tokai

(10) Patent No.: US 7,651,027 B2
(45) Date of Patent: Jan. 26, 2010

(54) REMOTE INSTRUCTION SYSTEM AND METHOD THEREOF

(75) Inventor: Kiwame Tokai, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 749 days.

(21) Appl. No.: 11/334,384

(22) Filed: Jan. 19, 2006

(65) Prior Publication Data
US 2006/0290786 A1 Dec. 28, 2006

(30) Foreign Application Priority Data
Jun. 16, 2005 (JP) ............................. 2005-175830

(51) Int. Cl.
*G06K 7/10* (2006.01)
(52) U.S. Cl. .................. 235/454; 348/207.99; 345/419
(58) Field of Classification Search ................. 235/454; 348/207.99, 211.12, 143; 345/419, 619
See application file for complete search history.

(56) References Cited

U.S. PATENT DOCUMENTS

| 6,061,717 | A | * | 5/2000 | Carleton et al. ............. 709/205 |
| 2002/0113803 | A1 | * | 8/2002 | Samra et al. ................. 345/619 |
| 2003/0137506 | A1 | * | 7/2003 | Efran et al. .................. 345/419 |
| 2004/0070674 | A1 | | 4/2004 | Foote et al. |
| 2004/0126038 | A1 | * | 7/2004 | Aublant et al. .............. 382/305 |
| 2005/0273700 | A1 | * | 12/2005 | Champion et al. .......... 715/512 |
| 2006/0259193 | A1 | * | 11/2006 | Wang et al. .................. 700/245 |
| 2007/0156816 | A1 | * | 7/2007 | Zhang et al. ................. 709/204 |

* cited by examiner

*Primary Examiner*—Ahshik Kim
(74) *Attorney, Agent, or Firm*—Oliff & Berridge, PLC

(57) ABSTRACT

A remote instruction system includes a controller that controls an image capturing portion to capture an image of a target and transmit a captured image to a remote terminal, and controls a projecting portion to project an annotation image onto the target according to an instruction on the captured image given by the remote terminal, and a relative position changing portion that is controlled by the instruction on the captured image given by the remote terminal and changes the position of the target relative to the image projection portion and the image capturing portion.

11 Claims, 6 Drawing Sheets

REMOTE INSTRUCTION SYSTEM AND METHOD THEREOF

BACKGROUND OF THE INVENTION

1. Field of the Invention

This invention relates to a remote instruction system that an instruction can be given remotely by means of an image.

2. Description of the Related Art

In a remote repair system, remote maintenance system, remote medical care system, remote conferencing, and the like, for example, various instructions in operation procedure need to be given to a real thing from a remotely located position. As one of remote instruction systems where the instructions can be given to the real thing from the remote location, for example, U.S. Patent Application Publication No. 2004/0070674 describes a technique of sending a moving image to a remote terminal while a subject or target existent on the real thing side is being captured by a camcorder, and projecting an annotation image onto the subject by means of a projector on the real thing side, the annotation image being designated on the basis of the captured image on the remote terminal.

In the above-described remote instruction system, however, when a projection position of an annotation image onto a subject is changed according to an instruction given by a remote terminal, a range in which the projection position can be changed is limited to one being displayed on a display screen of the remote terminal, namely, a range which is captured by a camcorder. Therefore, if the annotation image is to be projected onto outside the afore-described range, it is necessary to give an instruction verbally to the operator or viewer who are existent on the subject side to change the position of the subject. If the position of the subject relative to the camcorder is changed, the projection position onto the subject projected by the projector has to be changed accordingly. At this time, three-dimensional positional information of the subject relative to the projector is necessary. However, it is not easy to obtain the three-dimensional positional information of the whole subject accurately. Accordingly, it is difficult to change the projection position of the annotation image precisely.

SUMMARY OF THE INVENTION

The present invention has been made in view of the above circumstances and provides a remote instruction system, in which it is possible to enlarge a range where an annotation image can be projected onto a target according to an instruction given by a remote site and improve the accuracy of a projection position of the annotation image.

According to one aspect of the present invention, there is provided A remote instruction system including a controller that controls an image capturing portion to capture an image of a target and transmit a captured image to a remote terminal, and controls a projecting portion to project an annotation image onto the target according to an instruction on the captured image given by the remote terminal; and a relative position changing portion that is controlled by the instruction on the captured image given by the remote terminal and changes the position of the target relative to the image projection portion and the image capturing portion.

According to another aspect of the present invention, there is provided a remote instruction method including: controlling an image capturing portion to capture an image of a target and transmit a captured image to a remote terminal; controlling a projecting portion to project an annotation image onto the target according to an instruction on the captured image given by the remote terminal; and changing a position of the target relative to the image projection portion and the image capturing portion.

With the afore-mentioned configuration, the position of the target (the viewpoint relative to the target in a remote site) can be changed from the remote site, thus enabling the range in which the annotation image can be projected to be enlarged.

BRIEF DESCRIPTION OF THE DRAWINGS

Embodiments of the present invention will be described in detail based on the following figures, wherein.

DESCRIPTION OF THE EMBODIMENTS

A description will now be given, with reference to the accompanying drawings, of embodiments of the present invention.

Figure 1:
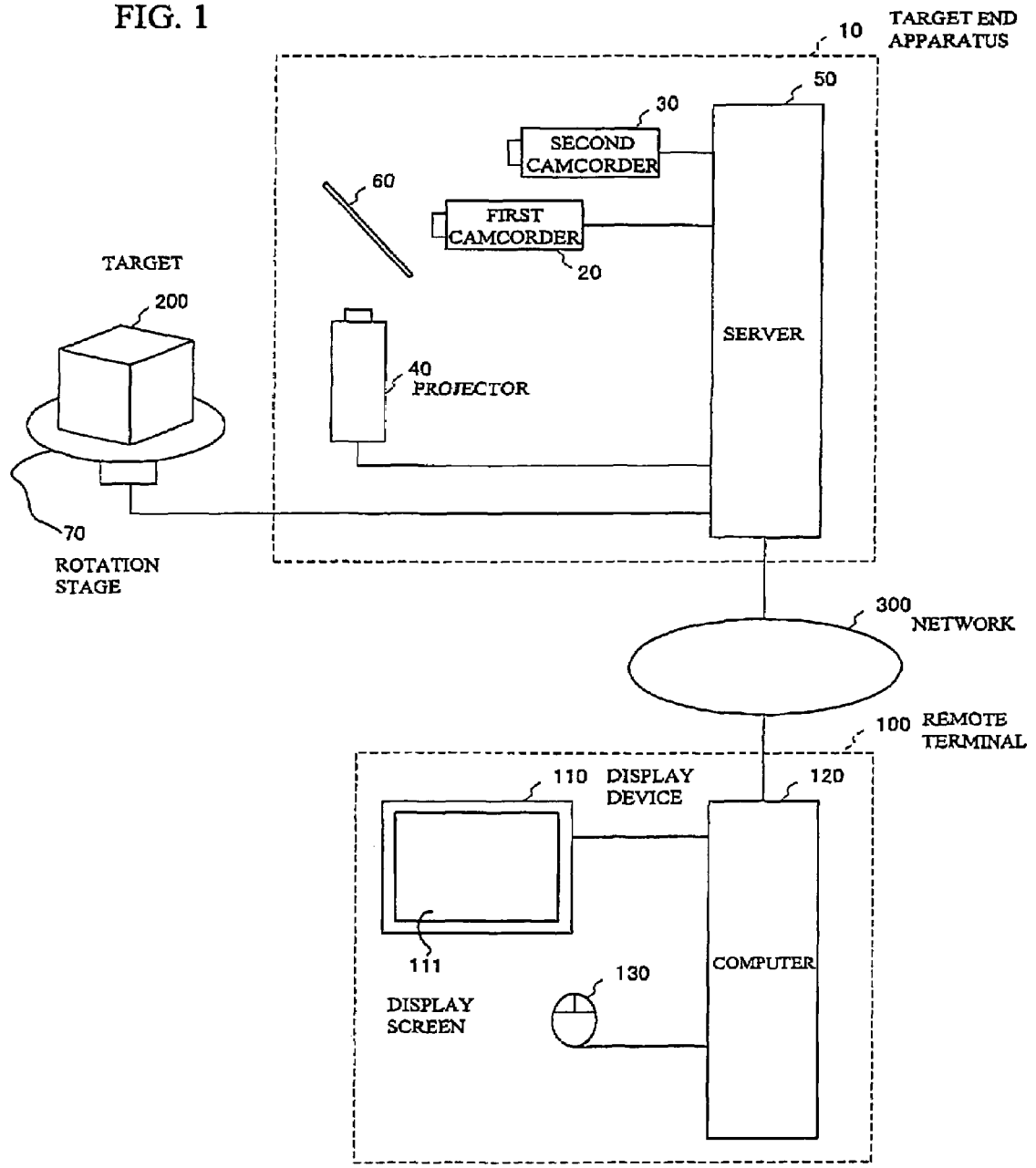
FIG. 1 is a block diagram showing an embodiment in accordance with a remote instruction system of the present invention.

FIG. 1 is a block diagram showing an embodiment in accordance with a remote instruction system of the present invention. In the remote instruction system, there are provided a target end apparatus 10 and a remote terminal 100, as shown in FIG. 1. The target end apparatus 10 and the remote terminal 100 are connected via a network 300 so that they can communicate with each other. Only one remote terminal 100 is shown in FIG. 1, yet multiple remote terminals 100 can be connected to a server 50 on the target end apparatus 10, as will be described later, via the network 300.

Hereinafter, a target, subject, or object denotes anything to be or being captured by an image capturing apparatus or image capturing portion.

The target end apparatus 10 includes a first camcorder 20 that serves as a first image capturing portion, a second camcorder 30 that serves as a second image capturing portion, a projector 40 that serves as a projection portion, the server 50 that serves as a controller, a half mirror 60, and a rotation stage 70 that serves as a relative position changing portion.

The first camcorder 20 and the second camcorder 30 are composed of, for example, a CCD camera, and are provided in such a manner that the image of a target 200 arranged on the rotation stage 70 can be captured from different positions. Such captured images are imported into the server 50. Here, the first camcorder 20 captures the image through the half mirror 60.

The projector 40 is composed of a crystal liquid projector or the like, and is provided so that an optical system thereof has an optical principal point, which is substantially aligned with that of the first camcorder 20 by using the half mirror 60. The projector 40 projects an annotation image transmitted from the server 50 via the optical system thereof and the half mirror 60. The annotation image transmitted from the projector 40 is reflected by the half mirror 60 and projected onto the target 200. The annotation image may include any type of image such as line, character, drawing, and the like.

The rotation stage 70 is controlled by the server 50, and the positions of the target 200 relative to the first camcorder 20, the second camcorder 30, and the projector 40 are changed by rotating the target 200 provided thereon.

The server 50 controls operations of the first camcorder 20, the second camcorder 30, the projector 40, and the rotation stage 70, and in addition, sends and receives various types of information to and from the remote terminal 100 via the network 300. The server 50 transmits the captured images captured by the first camcorder 20 and the second camcorder 30 to the remote terminal 100, and projects the annotation image onto the target 200, according to an instruction on the captured image given by the remote terminal 100. Further, the server 50 controls to change the projection position of the annotation image projected by the projector 40 onto the target 200, in accordance with the rotation (movement) of the target 200 together with the rotation stage 70. At this time, the server 50 calculates three-dimensional coordinates of the projection position of the annotation image projected onto the target 200 on the basis of the captured images captured by the first camcorder 20 and the second camcorder 30, and changes the position of the annotation image projected by the projector 40 on the basis of such calculated three-dimensional coordinates. Specific processes will be described later in detail.

The remote terminal 100 includes a display device 110 such as a crystal liquid device, CRT, or the like, a computer 120 connected to the network 300, and a pointing device (mouse) 130 connected to the computer 120. The display device 110 displays the image being transmitted from the target end apparatus 10, on the display screen thereof. The pointing device (mouse) 130 is used for forming an instruction on the annotation image to be projected onto the target 200, by manipulating various buttons or the like with a pointer on the display screen on which the captured image is being displayed, and is also used for giving an instruction on the rotation of the target 200 by rotating the rotation stage 70.

Figure 2:
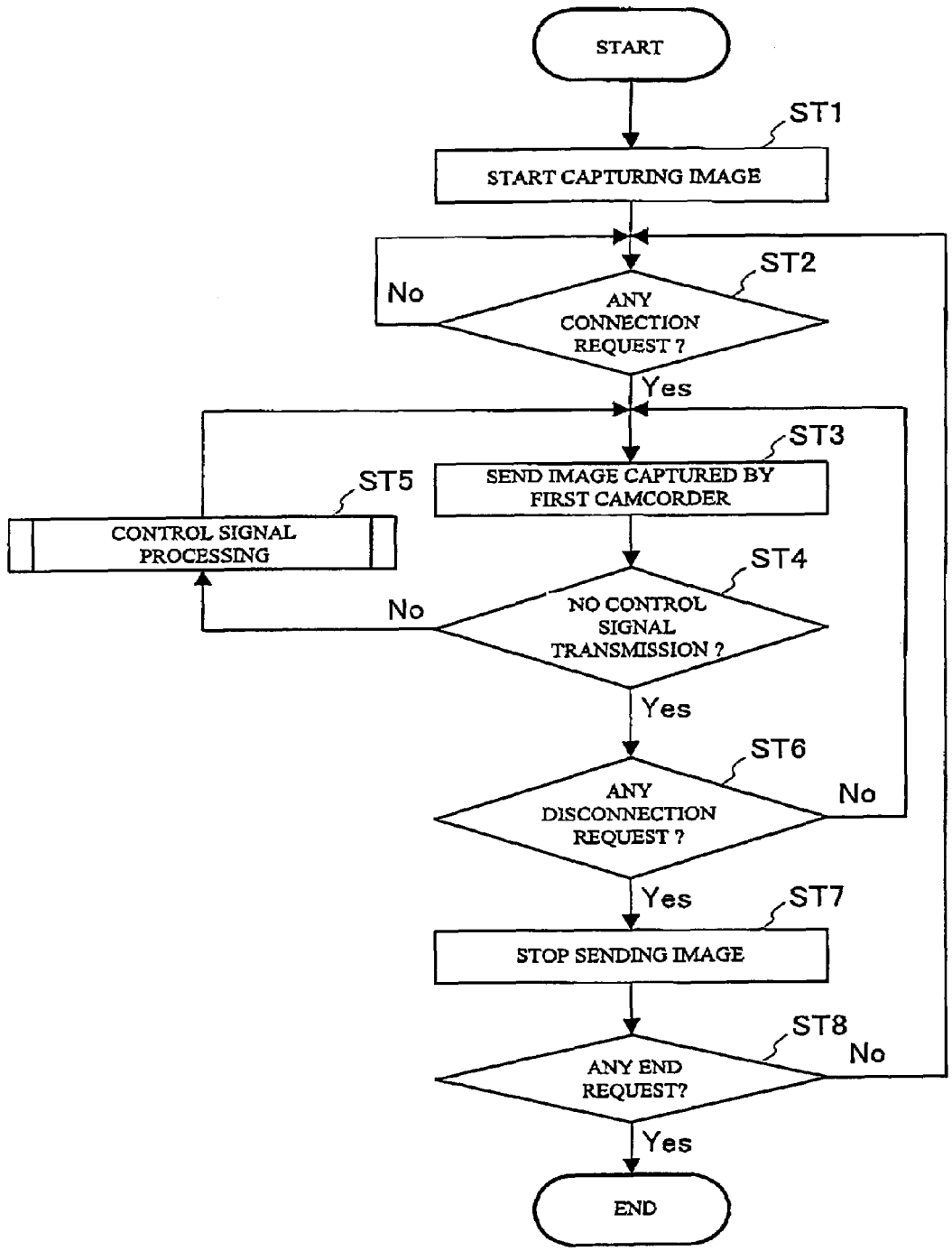
FIG. 2 is a flowchart showing an example of process on the server in a target end apparatus.
Figure 3:
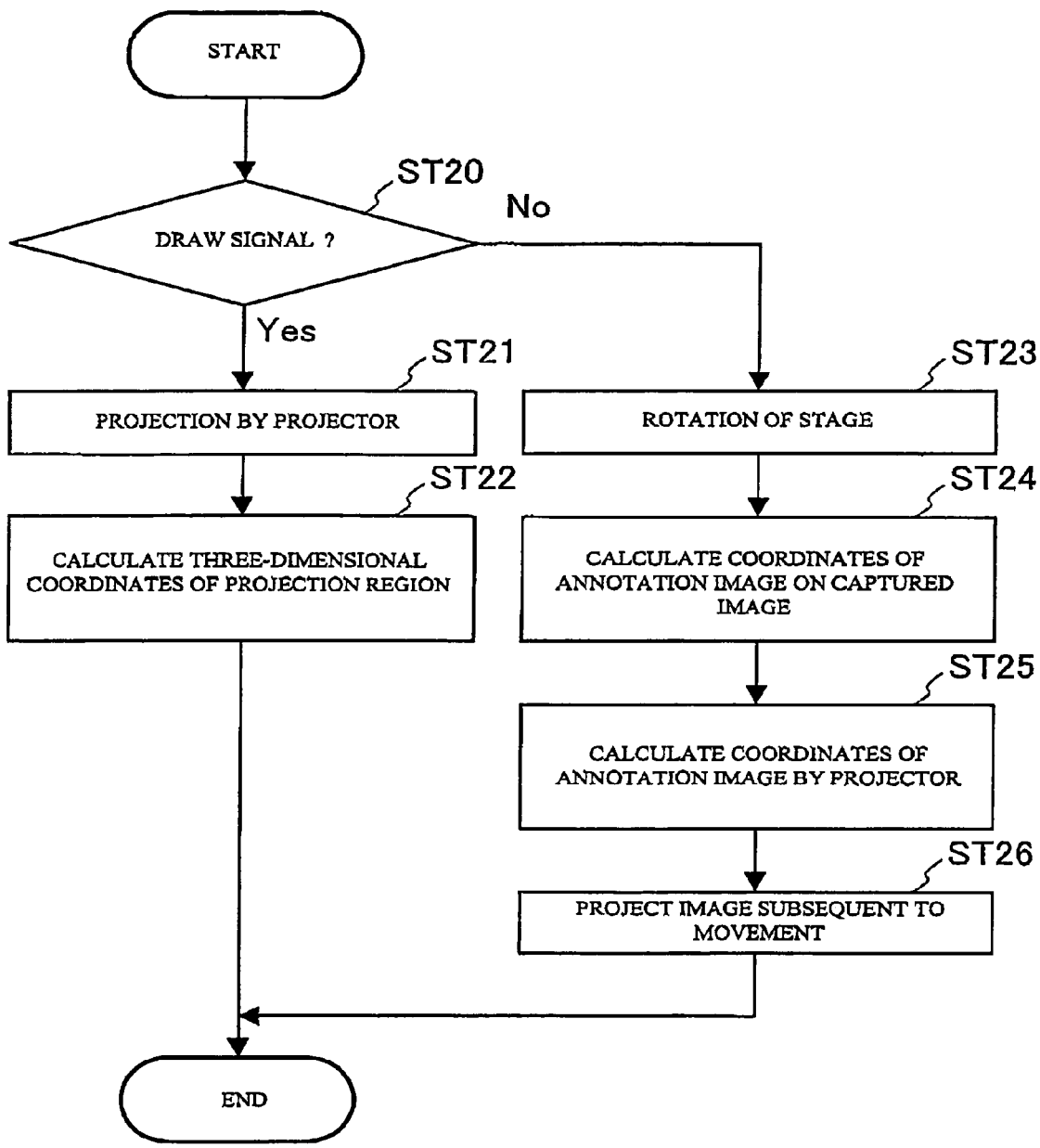
FIG. 3 is a flowchart showing an example of process in control signal processing in the flowchart shown in FIG. 2.
Figure 4:
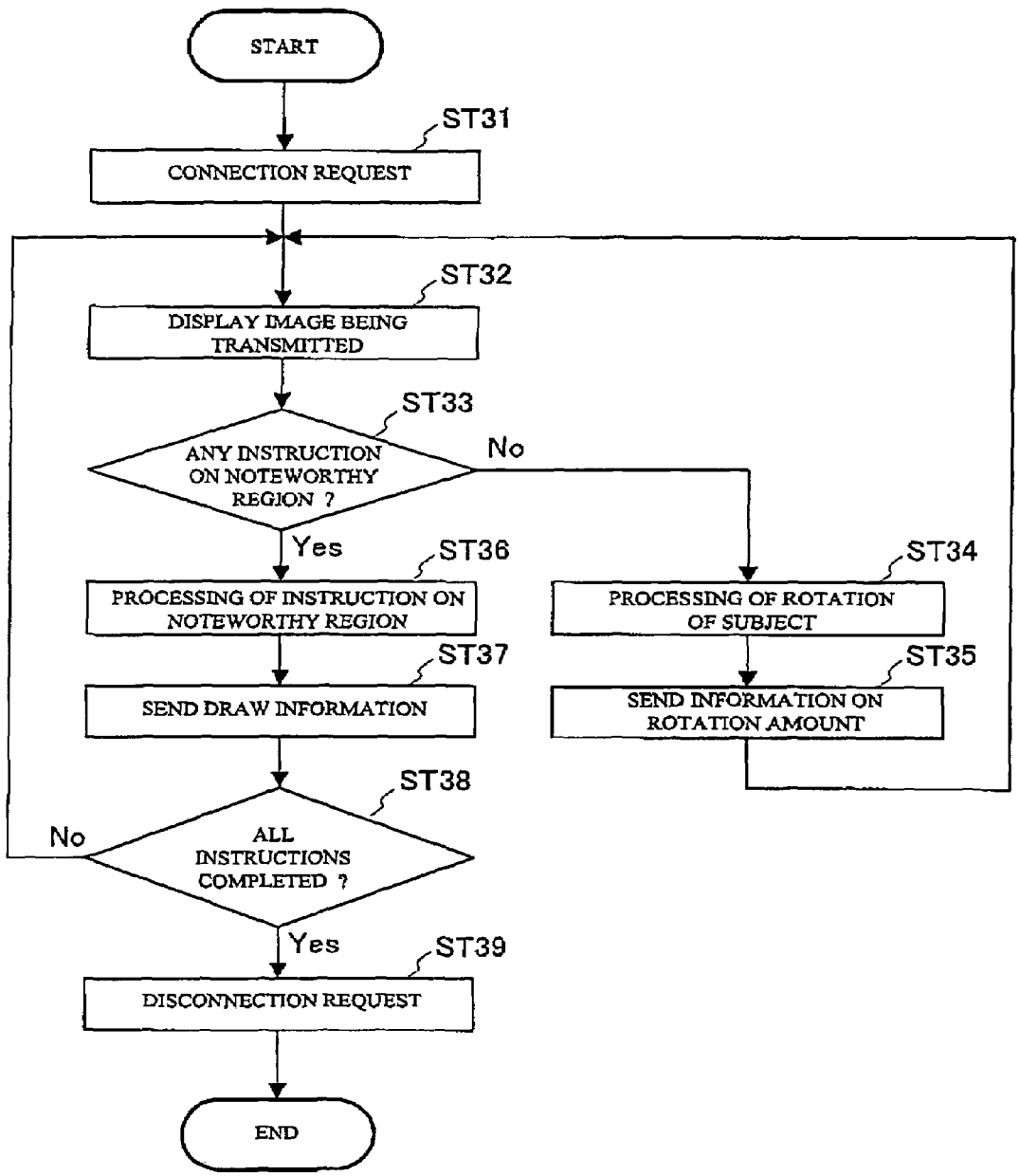
FIG. 4 is a flowchart showing an example of process in forming an image on a computer of a remote terminal.
Figure 5A:
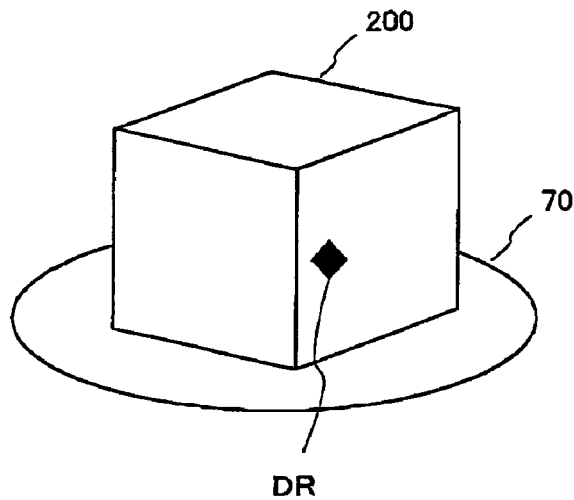
FIGS. 5A through 5C are views illustrating a change procedure of an image projection position in accordance with the rotation of a target.
Figure 5B:
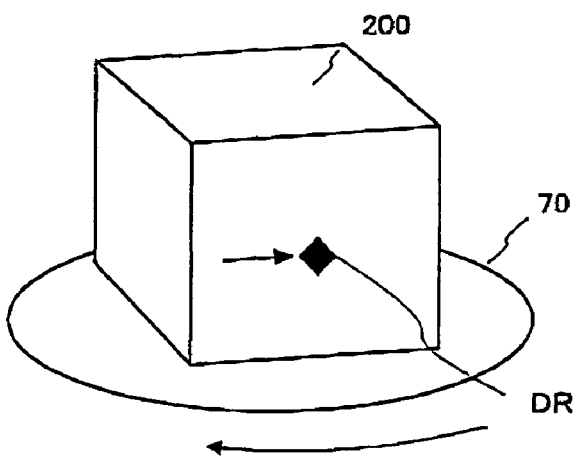
Figure 5C:
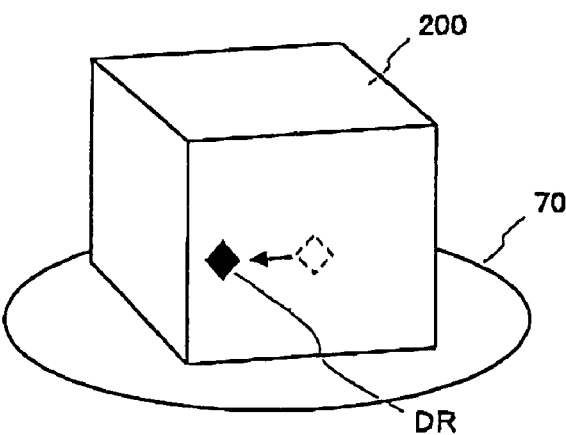
Figure 6:
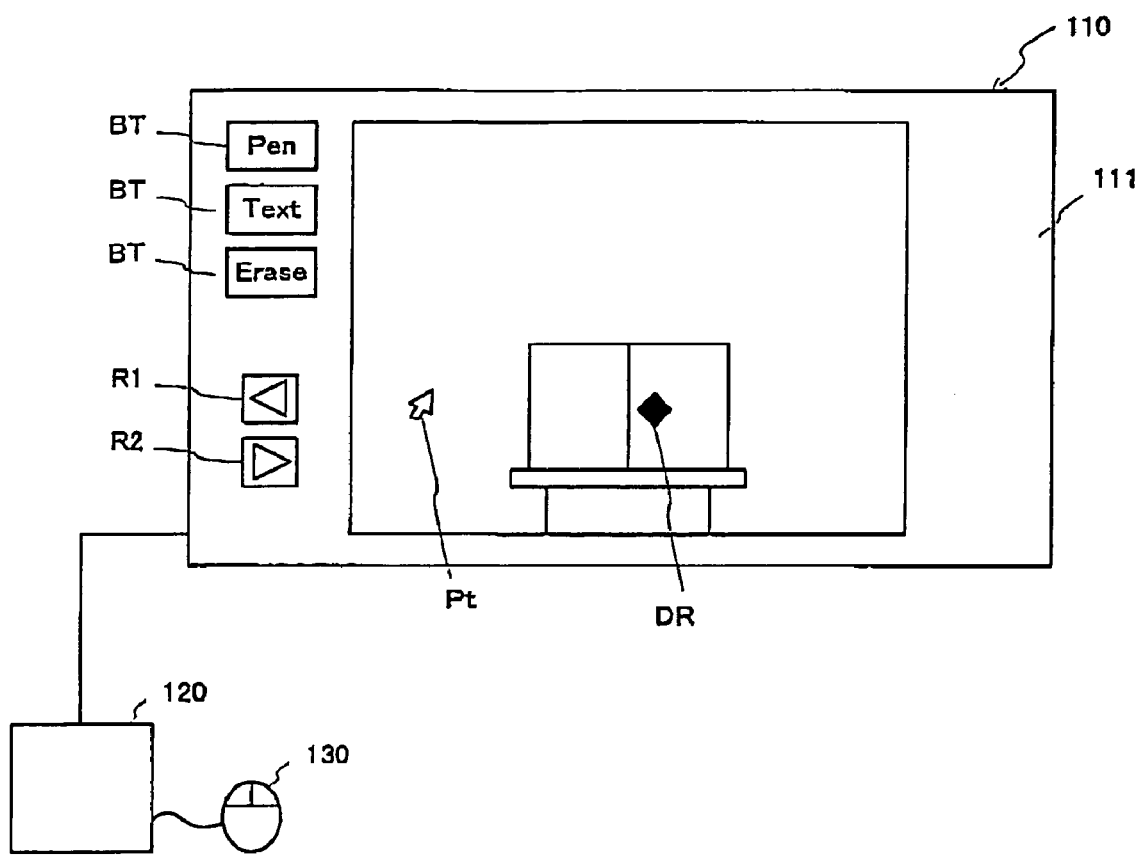
FIG. 6 is a view illustrating an example of operation in the remote terminal.

Next, a description will be given, with reference to FIG. 2 through FIG. 6, of operations of the remote instruction system having the above-described configuration. FIG. 2 is a flowchart showing an example of process on the server in the target end apparatus. FIG. 3 is a flowchart showing an example of process in the control signal processing (step ST5) in the flowchart shown in FIG. 2. FIG. 4 is a flowchart showing an example of process in creating an image on the computer of the remote terminal. FIGS. 5A through 5C are views illustrating a change procedure of the image projection position in accordance with the rotation of the target. FIG. 6 is a view illustrating an example of operation in the remote terminal.

Referring to FIG. 2, the server 50 in the target end apparatus 10 starts importing the captured images captured by the first camcorder 20 and the second camcorder 30 (step ST1), and determines whether there is a connection request from the computer 120 of the remote terminal 100 (step ST2). If there is a connection request from the computer 120, the captured image captured by the first camcorder 20 is transmitted to the computer 120 of the remote terminal via the network 300 (step ST3).

Then, the server 50 determines whether a control signal has been transmitted from the computer 120 (step ST4). The control signal serves as a draw signal that includes information on the drawing of the annotation image and also serves as a position control signal to rotate the rotation stage 70. If the server 50 has received the afore-mentioned control signal, the server 50 implements a control signal processing according to the content thereof, as will be described later (step ST5).

In contrast, if the server 50 has not received the afore-mentioned control signal, the server 50 determines whether there is a disconnection request issued from the computer 120 (step ST6). If there is no disconnection request, processing goes back to step ST3 to send a newly captured image to the computer 120 of the remote terminal 100 via the network 300. If there is a disconnection request, the server 50 stops sending the captured image captured by the first camcorder 20 (step ST7). Then, the sever 50 determines whether there is an end request of processing (step ST8). If there is no end request, processing goes back to step ST2 to repeat the above-described processes. If there is an end request, the sever 50 completes the process.

A description will now be given of a control signal processing in step ST5. Referring to FIG. 3, first, the server 50 determines whether the draw signal has been received from the remote terminal 100 (step ST20). Upon receiving the draw signal, the server 50 renders an annotation image DR on the projector 40 according to the draw signal, and projects the image onto the target 200 (step ST21), as shown in FIG. 5A, for example. A portion on which the annotation image DR is projected onto the target 200 by the projector 40 is one that the operator of the remote terminal 100 likes to indicate or annotate to the operator of the target end apparatus 10. Therefore, this portion is brighter than any other portion of the target 200.

Then, the server 50 projects the annotation image DR onto the target 200 with the projector 40, and calculates three-dimensional coordinates of the projection position of the annotation image DR on the target 200, on the basis of the captured images captured by the first camcorder 20 and the second camcorder 30 and the principle of triangular surveying (step ST22). As described heretofore, the projection portion of the annotation image DR is particularly brighter than the surrounding thereof on the target 200. This reduces the possibility of generating miss calculation to be less than the general triangular surveying in implementing the block matching or matching with the characteristic edge. Furthermore, the first camcorder 20 has the principal point substantially aligned with that of the optical system of the projector 40. Hence, the projection coordinates of the projector 40 correspond one-to-one to those of the first camcorder 20, in spite of the shape of the target. This eliminates the necessity of searching the projection image. It is therefore possible to significantly reduce the calculation amount necessary for calculating a distance to the target 200 to specify a position of the three-dimensional coordinates on the surface of the target 200.

If the server 50 has not received the draw signal, in other words, if the server 50 has received the position control signal to rotate the rotation stage 70, the rotation stage 70 is rotated according to a rotation amount and a rotation direction according to the content of the position control signal, as shown in FIG. 5B (step ST23). If the rotation stage 70 is rotated, the projection position of the annotation image DR being projected onto the target 200 is changed. For this reason, first, the three-dimensional coordinates of the annotation image DR on the captured image captured by the first camcorder is calculated according to the rotation amount obtained with the above-mentioned position control signal, when the annotation image DR is moved in accordance with the rotation of the rotation stage 70 (step ST24). Then, the three-dimensional coordinates of the annotation image DR on the projector 40 are calculated when the annotation image DR is moved according to the rotation of the rotation stage 70 (step ST26). Next, the annotation image DR subsequent to the movement is projected onto the target 200, as shown in FIG. 5C (step ST26).

A description will now be given of a calculation method of the three-dimensional coordinates of the projection position of the annotation image DR, when the annotation image DR is moved (subsequent to the rotation of the rotation stage 70) in accordance with the rotation of the rotation stage 70. First, three-dimensional coordinates P0 subsequent to the rotation is obtained with the following expression, where P1 denotes three-dimensional coordinates of the projection position of the rotation stage prior to the rotation, which is obtained in step ST22.

$$\overline{P0} = \overline{Pt} + R(\overline{P1} - \overline{Pt})$$ [Expression 1]

However, it is supposed that a normalized direction vector n and a passing point Pt, which are represented as column vectors in the coordinate system of the first camcorder 20.

$$n = \begin{bmatrix} nx \\ ny \\ nz \end{bmatrix}$$ [Expression 2]

$$Pt = \begin{bmatrix} Ptx \\ Pty \\ Ptz \end{bmatrix}$$

Here, R denotes a matrix that passes the origin and rotates around the normalized direction vector at an angle of θ, and may be described as the following expression. R is obtainable by the rotation amount of the position control signal.

$$R = \begin{bmatrix} n_x^2(1-c)+c & n_x n_y(1-c)-n_z s & n_x n_z(1-c)-n_y s \\ n_y n_x(1-c)+n_z s & n_y^2(1-c)+c & n_y n_z(1-c)-n_x s \\ n_x n_z(1-c)-n_y s & n_y n_z(1-c)+n_x s & n_z^2(1-c)+c \end{bmatrix}$$ [Expression 3]

where c=cos θ and s=sin θ.

With respect to the afore-mentioned three-dimensional coordinates, the perspective transformation is performed by the first camcorder 20, and it is possible to calculate the coordinates of the captured image captured by the first camcorder 20. As described above, the coordinates of the captured image captured by the first camcorder 20 correspond one-to-one to the coordinates of the projection position projected by the projector 40. Therefore, it is possible to change the position of the image DR according to the rotation amount of the rotation stage 70, if the image DR is projected on the basis of the afore-described correspondence.

Now, the operation of the remote terminal 100 will be described. First, referring to FIG. 4, the computer 120 of the remote terminal 100 issues a connection request to the server 50 (step ST31). Next, when the connection is established, the computer 120, for example, displays the captured image being transmitted from the server 50 in the target end apparatus on the display screen of the display device 110, as shown in FIG. 6 (step ST32).

Then, the computer 120 determines whether there is an instruction, which has been given by the operator, on a noteworthy region in the captured image being displayed on a display screen 111 of the display device 110 (step ST33). If there is an instruction on the noteworthy image, a process according to the instruction is implemented (step ST36). Specifically, if the operator of the remote terminal 100 likes to project the annotation image onto a region in the image being displayed while watching the image being displayed on the display screen 111 of the display device 110 as shown in FIG. 6, the operator manipulates the pointing device 130 and moves a pointer Pt being displayed on the display screen 111 to indicate or annotate the noteworthy region. The noteworthy region is a region that specifies the projection position onto which the annotation image is projected. At this time, the information on the annotation image to be projected onto the noteworthy region is indicated simultaneously. For example, by manipulating various buttons BT or the like provided on the display screen 111 with the pointing device 130, indicated are graphic information such as rectangle or circle to be drawn, bitmap image that has been prepared in advance, text information that has been input on the keyboard, and a pointer that reflects the movement of the pointing device 130. The computer 120 transmits the various kinds of information specified in step ST36 as draw information to the server 50 (step ST37).

Next, the computer 120 determines whether the instruction given by the operator of the remote terminal 100 based on the captured image being captured by the first camcorder 20 has been completed (step ST38). If the instruction has been completed, the computer 120 issues a disconnection request to the server 50 (step ST39), and completes the process. If the instruction by the operator of the remote terminal 100 has not been completed, processing goes back to step ST32 to repeat the above-described processes.

At this time, if the operator of the remote terminal 100 likes to rotate the target 200, the operator manipulates rotation buttons R1 and R2 to rotate the rotation stage 70 provided on the display screen 111 and give instructions on the rotation direction and the rotation amount of the rotation stage 70, so as to display the region onto which the annotation image is to be projected on the target 200 in the displayed image or so as to provide a most suitable viewpoint relative to the target 200, while watching the image being displayed on the display screen 111 as shown in FIG. 6. If there is no instruction on the noteworthy region (no instruction on the annotation image is given) in step ST33, the computer 120 determines that the operator of the remote terminal 100 gives an instruction on the rotation of the target 200, and implements the process relating to the rotation of the target 200 (step ST34). Then, the computer 120 transmits the information on the rotation amount (the information on the movement amount) or the like to the server 50 in the target end apparatus (step ST35). This rotates the rotation stage 70, changes the rotation position of the target 200, and displays a newly captured image on the display device 110 of the remote terminal 100 (step ST32).

As described heretofore, in accordance with the present embodiment, it is possible to change the position of the target 200 (the viewpoint relative to the target 200) according to the instruction given by the remote terminal 100 on the basis of the captured image, and accordingly it is possible to enhance the instruction operability of the remote terminal 100 and enlarge the range in which the annotation image can be projected onto the target 200. In addition, in accordance with the present embodiment, even if the position of the target 200 is changed from the remote terminal 100, the projection position of the annotation image is automatically changed in accordance with the afore-mentioned change, thereby enabling the operability to be further improved. Furthermore, it is possible to precisely detect the three-dimensional coordinates of the projection position of the annotation image on the target 200, according to the principle of the triangular surveying, on the basis of the captured images captured by the first and second camcorders 20 and 30. This allows the projection position of the annotation image to be adjusted accurately according to the rotation or movement of the target 200.

In the above-described embodiment, the description has been given of the projector exemplified as a projection portion. However, the projection portion is not limited to the projector. For example, the image may be created by irradiating the beam such as a laser beam onto the target.

In the above-mentioned embodiment, the rotation stage has been exemplified as a relative position changing portion. However, the relative position changing portion is not limited to the rotation stage. For instance, a robot or the like may be applicable to the relative position changing portion. In the above-mentioned embodiment, the description has been given to the target to be moved. However, for example, the camcorder that serves as the image capturing portion or the projector that serves as the projection portion may be moved.

In the above-mentioned embodiment, the description has been given to the rotation buttons R1 and R2 provided on the display screen 111 so as to give an instruction to rotate the rotation stage 70. However, instead of the rotation buttons R1 and R2, a keyboard may be utilized for giving an instruction to rotate the rotation stage 70. An alternate method may be employed.

In the above-mentioned embodiment, the remote terminal 100 is connected to the server 50 via the network 300. However, an alternate method may be employed to connect the remote terminal 100 to the server 50. The remote terminal 100 may be provided in the target end apparatus.

In the above-mentioned embodiment, the description has been given of a case where only the captured image being captured by the first camcorder 20 is transmitted to the remote terminal 100 from the server 50. However, the captured image being captured by the second camcorder 30 may be transmitted to the remote terminal 100.

In the above-mentioned system, the relative position changing portion may include a rotation stage that can rotate the target. With the afore-mentioned configuration, it is possible to project the annotation image on the entire surrounding of the target.

According to the present invention, it is possible to enlarge the range in which the annotation image can be projected onto the target according to the instruction given by the remote site and improve the accuracy of the projection position of the annotation image.

Although a few embodiments of the present invention have been shown and described, it would be appreciated by those skilled in the art that changes may be made in these embodiments without departing from the principles and spirit of the invention, the scope of which is defined in the claims and their equivalents.

The entire disclosure of Japanese Patent Application No. 2005-175830 filed on Jun. 16, 2005 including specification, claims, drawings, and abstract is incorporated herein by reference in its entirety.

What is claimed is:

1. A remote instruction system comprising:
   a controller that controls an image capturing portion to capture an image of a three-dimensional target and transmit a captured image to a remote terminal, and controls a projector that projects an annotation image onto an exterior surface of the three-dimensional target according to an instruction on the captured image given by the remote terminal; and
   a relative position changing portion that is controlled by the instruction on the captured image given by the remote terminal and changes the position of the target relative to the image projection portion and the image capturing portion.

2. The remote instruction system according to claim 1, wherein the controller changes a projection position of the annotation image relative to the target in accordance with a movement of the target made by the relative position changing portion.

3. The remote instruction system according to claim 2, wherein the controller calculates the projection position of the annotation image after the movement of the target, on the basis of the projection position of the annotation image obtained from the captured image prior to the movement of the target made by the relative position changing portion, and a control signal applied to the relative position changing portion.

4. The remote instruction system according to claim 1, wherein the instruction is given to the relative position changing portion according to an operation to change a relative position to the captured image being displayed on a display screen of the remote terminal.

5. The remote instruction system according to claim 1, wherein the relative position changing portion includes a rotation stage that can rotate the target.

6. The remote instruction system according to claim 1,
   wherein the annotation image projected onto the target is captured by the image capturing portion.

7. A remote instruction system comprising:
   a controller that controls an image capturing portion to capture an image of a target and transmit a captured image to a remote terminal, and controls a projecting portion to project an annotation image onto the target according to an instruction on the captured image given by the remote terminal;
   a relative position changing portion that is controlled by the instruction on the captured image given by the remote terminal and changes the position of the target relative to the image projection portion and the image capturing portion;
   a first image capturing portion and a second image capturing portion to capture images of the target from different positions,
   wherein:
      the controller changes a projection position of the annotation image relative to the target in accordance with a movement of the target made by the relative position changing portion,
      the controller calculates the projection position of the annotation image after the movement of the target, on the basis of the projection position of the annotation image obtained from the captured image prior to the movement of the target made by the relative position changing portion, and a control signal applied to the relative position changing portion, and
      the controller calculates three-dimensional coordinates of the projection position of the annotation image prior to the movement of the target, on the basis of the images captured by the first image capturing portion and the second image capturing portion.

8. The remote instruction system according to claim 7, wherein the projection portion projects the annotation image onto the target in an optical system that has an optical principal point substantially aligned with that of the first image capturing portion.

9. A remote instruction method comprising:
controlling an image capturing portion to capture an image of a three-dimensional target and transmit a captured image to a remote terminal;
controlling a projector that projects an annotation image onto an exterior surface of the three-dimensional target according to an instruction on the captured image given by the remote terminal; and
changing a position of the target relative to the image projection portion and the image capturing portion.

10. The remote instruction method according to claim 9, further comprising a step of changing a projection position of the annotation image relative to the target in accordance with a movement of the target.

11. The remote instruction method according to claim 10, further comprising a step of calculating the projection position of the annotation image after the movement of the target, on the basis of the projection position of the annotation image obtained from the captured image prior to the movement of the target, and a control signal used for changing the position of the target.

* * * * *